US009284398B2

(12) United States Patent
Guan et al.

(10) Patent No.: US 9,284,398 B2
(45) Date of Patent: Mar. 15, 2016

(54) MODIFIED CARBON NANOTUBES AND THEIR COMPATIBILITY

(75) Inventors: Jingwen Guan, Ottawa (CA); Robin Fraser, Toronto (CA); Benoit Simard, Orleans (CA)

(73) Assignee: National Research Council of Canada, Ottawa, Ontario ( * ) Notice: Subject to any disclaimer, the term of this patent is extended or adjusted under 35 U.S.C. 154(b) by 221 days.

(21) Appl. No.: 13/702,106

(22) PCT Filed: Jun. 10, 2011

(86) PCT No.: PCT/CA2011/000683
§ 371 (c)(1),
(2), (4) Date: Dec. 5, 2012

(87) PCT Pub. No.: WO2011/153629
PCT Pub. Date: Dec. 15, 2011

(65) Prior Publication Data
US 2013/0137822 A1    May 30, 2013

Related U.S. Application Data

(60) Provisional application No. 61/353,737, filed on Jun. 11, 2010.

(51) Int. Cl.
| | |
|---|---|
| *C08F 226/02* | (2006.01) |
| *B82Y 30/00* | (2011.01) |
| *B82Y 40/00* | (2011.01) |
| *C01B 31/02* | (2006.01) |
| *C09C 1/44* | (2006.01) |

(52) U.S. Cl.
CPC .............. *C08F 226/02* (2013.01); *B82Y 30/00* (2013.01); *B82Y 40/00* (2013.01); *C01B 31/0273* (2013.01); *C09C 1/44* (2013.01); *C01B 2202/02* (2013.01); *C01B 2202/06* (2013.01); *C01P 2002/88* (2013.01); *C01P 2004/03* (2013.01); *C01P 2004/04* (2013.01); *Y10S 977/746* (2013.01)

(58) Field of Classification Search
USPC ............................................ 525/63; 977/748
See application file for complete search history.

(56) References Cited

U.S. PATENT DOCUMENTS

| | | | |
|---|---|---|---|
| 7,250,147 B2 | 7/2007 | Tour et al. | |
| 2007/0232748 A1* | 10/2007 | Guerret et al. ................ | 524/545 |
| 2008/0306202 A1* | 12/2008 | Lin et al. ....................... | 524/432 |
| 2009/0301349 A1 | 12/2009 | Afzali-Ardakani et al. | |
| 2010/0098931 A1 | 4/2010 | Daniel et al. | |
| 2011/0300368 A1* | 12/2011 | Qi et al. ...................... | 428/296.4 |

FOREIGN PATENT DOCUMENTS

| | | |
|---|---|---|
| CA | 2679280 | 9/2008 |
| CA | 2801617 | 12/2011 |
| WO | 2008048238 | 4/2008 |
| WO | 2008104078 | 9/2008 |
| WO | 2009023579 | 2/2009 |
| WO | 2011153629 | 12/2011 |

OTHER PUBLICATIONS

Lee et al., Sulfonated polyaniline network grafted multi-wall carbon nanotubes for enzyme immobilization, direct electrochemistry and biosensing of glucose, Microchemical Journal (2010), 95(1), 74-79, available online Oct. 2009.*
Bahr, Jeffrey L. et al., Highly Functionalized Carbon Nanotubes Using in Situ Generated Diazonium Compounds, Chem. Mater. 2001, 13, 3823-3824.
Choi, Jin Hwan, et al., Graft Polymerization of Styrene from Single-Walled Carbon Nanotube using Atom Transfer Radical Polymerization, Polymer Bulletin 55, 173-179 (2005).
Dyke, Christopher A., et al., Solvent-Free Functionalization of Carbon Nanotubes, J. Am. Chem. Soc. 2003, 125, 1156-1157.
Hill, Darron E., et al., Functionalization of Carbon Nanotubes with Polystyrene, Macromolecules 2002, 35, 9466-9471.
International Preliminary Report on Patentability dated Dec. 14, 2012 for PCT/CA2011/000683.
International Search Report dated Aug. 18, 2011 for PCT/CA2011/000683.
Koval'Chuk, Anton A., et al., Effect of Carbon Nanotube Functionalization on the Structural and Mechanical Properties of Polypropylene/MWCNT Composites, Macromolecules 2008, 41, 7536-7542.
Nayak, Rati Ranjan, et al., Synthesis and characterization of styrene grafted carbon nanotube and its polystyrene nanocomposite, European Polymer Journal 43 (2007) 4916-4923.
Nayak, Rati Ranjan, et al., A Novel Route for Polystyrene Grafted Single-Walled Carbon Nanotubes and their Characterization, Macromol. Chem. Phys. 2008, 209, 1137-1144.
Written Opinion dated Aug. 24, 2011 for PCT/CA2011/000683.
Yang, Bing-Xing, et al., Mechanical Reinforcement of Polyethylene Using Polyethylene-Grafted Multiwalled Carbon Nanotubes, Adv. Funct. Mater. 2007, 17, 2062-2069.
Zhihui, Yin, et al., Effects of the compatibilizer PP-g-GMA on morphology and mechanical properties of PP/PC blends, Polymer vol. 39 No. 3, pp. 547-551, 1998.

* cited by examiner

*Primary Examiner* — Jeffrey Mullis
(74) *Attorney, Agent, or Firm* — Laura Catherine Eckenswiller

(57) ABSTRACT

Modified carbon nanotubes are provided having carbon nanotube core covalently bound through C—C bonds to a polymer shell surrounding the carbon nanotube core. The polymer shell is a polymer having functional groups pointing outwardly from the shell. The functional groups are compatible with or able to covalently connect to another polymer. Such modified carbon nanotubes are more readily dispersed in a homogeneous manner in another polymer and may be used as a reinforcing filler in a polymer matrix. The modified carbon nanotubes with a core-shell structure in which the core has a substantially unidirectional orientation within the shell are produced by reacting neutral carbon nanotubes with 4-vinylaniline through a diazonium reaction in presence of one or more types of multifunctional monomers carrying a vinyl moiety and one or more functional groups for compatibilization with or connection to another polymer. The reaction is conducted at an elevated temperature without isolation of intermediates and without addition of any extra initiator or catalyst to form a polymer shell in situ around the carbon nanotube. The polymer shell is covalently bound to CNT sidewall through C—C bonds and has functional groups outwardly pointing from the shell for compatibilization with or connection to another polymer.

20 Claims, 8 Drawing Sheets

 
Fig. 11A        Fig. 11B
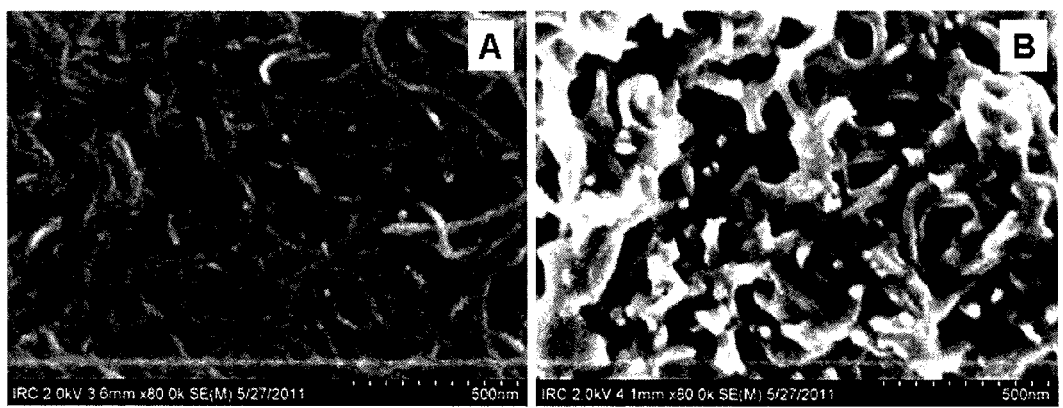
Fig. 12

MODIFIED CARBON NANOTUBES AND THEIR COMPATIBILITY

CROSS-REFERENCE TO RELATED APPLICATIONS

This application is a national phase entry of International Application PCT/CA2011/000683 filed Jun. 10, 2011 and claims the benefit of U.S. Provisional Patent Application Ser. No. U.S. Ser. No. 61/353,737 filed Jun. 11, 2010, the entire contents of both of which are herein incorporated by reference.

FIELD OF THE INVENTION

The present invention relates to carbon nanotubes, particularly to carbon nanotubes that have been modified for compatibilization with polymers, to processes for producing such modified carbon nanotubes and to their polymer nanocomposites.

BACKGROUND OF THE INVENTION

Carbon nanotubes (CNT), including multi-walled carbon nanotubes (MWCNT), few-walled carbon nanotubes (FWCNT), double-walled carbon nanotubes (DWCNT) and single-walled carbon nanotubes (SWCNT), have the best mechanical, electrical and thermal properties of any known material. These properties make CNT an attractive property enhancer for various matrices including polymers. However, owing to the strong van der Waals interactions (of the order of 0.5 eV per nm for SWCNT) which make CNT, especially SWCNT, self-assemble into bundles and, to their general chemical inertness, CNT are practically insoluble (or have very limited solubility) in all common solvents. This lack of solubility makes incorporation of CNT into various matrices including polymers extremely difficult. The interfacial problem that is the lack of compatibility between CNT and the matrices is an issue that still remains to be resolved in composite sciences.

With a view to improving compatibility of CNT in polymer matrices, there have been many attempts in the literature at covalent sidewall functionalization of CNT. One example is as follows (Bahr 2001; Dyke 2003):

In a second example (Nayak 2007), the authors claim the formation of a C—N bond on SWCNT surface in a solvent-free reaction which results in the attachment of a vinyl moiety on the CNT sidewall as follows:

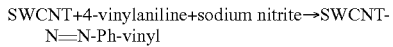

The SWCNT-N=N-Ph-vinyl product is isolated with a view to doing more chemistry on the vinyl moiety, and does not suggest that controlled polymerization is achievable without first isolating the SWCNT-N=N-Ph-vinyl product.

In a third example (Nayak 2008), Friedel-Crafts acylation involving a —COCl-substituted SWCNT and styrene in the presence of ZnO also results in attachment of a vinyl moiety on the CNT sidewall as follows:

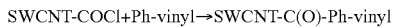

In a fourth example (Simard 2008), a free radical initiated polymerization reaction permits linking an epoxy group to a carbon nanotube through a polymerized bridging agent such as polystyrene or poly(methylmethacrylate).

In a fifth example (Guan 2008), an epoxy substituted molecule may be directly bound the surface of CNT by first priming the surface of CNT with negatively charged groups and then reacting the epoxy compound with the negatively charged CNT.

It is also known that CNT may be coated with polystyrene or copolymers of polystyrene in different ways (Hill 2002; Choi 2005).

However, none of the above attempts or other attempts in the prior art has satisfactorily addressed the issue of polymer-CNT compatibility in polymer nanocomposites.

SUMMARY OF THE INVENTION

It has now been found that it is possible to chemically modify the sidewall of CNT through formation of C—C covalent bonds and conduct an in situ polymerization to form polymer-coated CNT having one or more types of functional groups on the surface of the polymer coating that are compatible with or covalently connectable to a desired polymer. The modified CNT has a nanostructure comprising a central core formed by a single tube or small bundle of CNT and of an outer polymer shell having desired functional groups on the surface. The polymer shell is covalently bound by C—C bonds to the CNT sidewall and prevents CNT from re-agglomerating into large bundles, which is the inherent state of pristine CNT, specifically of purified CNT, and keeps the CNT unidirectional or one-dimensional within the coating. Thus, the CNT do not double-back on themselves or entangle into a ball or any other entangled shape within the cylindrical polymer shell structure. Such modified CNT are exceptionally suited for addressing the issue of polymer-CNT compatibility in a wide range of polymers. A wide range of CNT surface functionality is available providing increased flexibility in the choice of CNT design.

Thus, in one aspect of the present invention there is provided modified carbon nanotube comprising carbon nanotube core covalently bound through C—C bonds to a polymer shell surrounding the carbon nanotube core, the polymer shell comprising a polymer having functional groups pointing outwardly from the shell, the functional groups being compatible with or able to covalently connect to another polymer.

In another aspect of the present invention, there is provided a use of the modified carbon nanotubes of the present invention as a reinforcing filler in a polymer matrix.

In yet another aspect of the present invention, there is provided a polymeric nanocomposite comprising modified carbon nanotubes of the present invention.

In yet another aspect of the present invention, there is provided a polymeric nanocomposite comprising modified carbon nanotubes of the present invention mixed with another polymer.

In yet another aspect of the present invention, there is provided a process of producing modified carbon nanotube, the process comprising: reacting neutral carbon nanotube with 4-vinylaniline through a diazonium reaction in presence of one or more types of multifunctional monomers carrying a vinyl moiety and one or more functional groups for compatibilization with or connection to a polymer matrix, the reaction conducted at least in part at an elevated temperature without isolation of intermediates and without addition of any extra initiator or catalyst to form a polymer shell in situ around the carbon nanotube, the polymer shell covalently bound to CNT sidewall through C—C bonds and having functional groups outwardly pointing from the shell for compatibilization with or connection to another polymer.

Process Conditions:

Scheme 1 provides an overview of the in situ process for producing modified carbon nanotubes of the present invention. Thus, 4-vinylaniline in a reaction mixture is diazotized, the diazotized species subsequently reacting with the sidewall of neutral carbon nanotubes to provide vinyl phenyl groups covalently bound to the carbon nanotube through C—C bonds. The vinyl moieties of the vinyl phenyl groups anchored on the carbon nanotube core then polymerize in situ with vinyl moieties from multifunctional monomers (vinyl-M-X/Y) under the influence of heat to produce a polymer shell around and covalently bound to the carbon nanotube core. Functional groups X and Y are outwardly pointing on the polymer shell surface and are available for compatibilization with another polymer. One, two or more types of multifunctional monomers may be employed in the process. If only an excess of 4-vinylaniline is employed as the multifunctional monomer, then the polymer would be a homopolymer. If a multifunctional monomer other than 4-vinylaniline is employed, then the polymer formed would be a copolymer. A single multifunctional monomer has a vinyl moiety and one or more other functional groups.

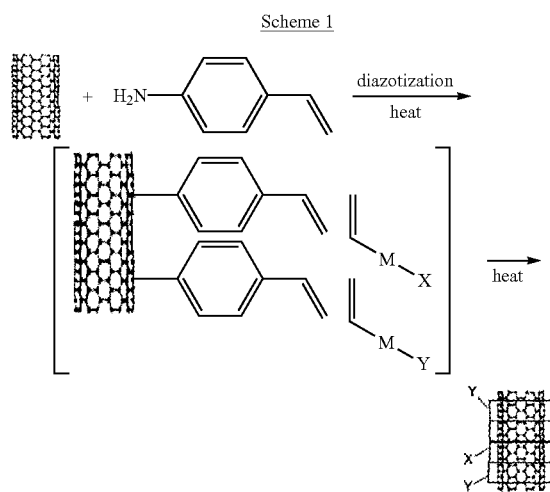

Scheme 1

The diazonium reaction may be effected with any suitable diazotization agent. Some examples of suitable diazotization agents include isoamyl nitrite, sodium nitrite, nitrous acid, nitrosonium ions (e.g. from $NOClO_4$ or $NOSO_4H$) or mixtures thereof. Isoamyl nitrite is particularly favorable.

At least part of the process is conducted at an elevated temperature in comparison to normal room temperature, which is nominally 25° C. However, parts of the process may be conducted at room temperature. The elevated temperature is preferably in a range of from about 30° C. to about 120° C., more preferably about 40° C. to about 120° C., even more preferably about 50° C. to about 115° C., yet more preferably about 60° C. to about 90° C. The temperature may be conveniently varied during the process if desired. Polymerization is effected through the use of heat and/or by free radicals formed in the diazonium reaction in situ, but no extra free radical initiator or catalyst is needed.

The process is conducted for any suitable length of time to yield the desired product. Typical reaction times are between about 8 and 80 hours. The process is preferably conducted in a solvent, such as an aqueous solvent or a common organic solvent, including but not limited to, water, an alcohol, acetonitrile, tetrahydrofuran, toluene, chlorobenzene, o-dichlorobenzene or mixtures thereof.

Advantageously, the process is simple, involving polymerization of the vinyl moieties from the multifunctional monomers by heating in situ while C—C covalent bonds are formed to the sidewall of the carbon nanotube. The polymerization is controllable providing a one-dimensional structure whereby an individual core-shell structure is formed in which a single carbon nanotube or a small bundle of carbon nanotube core is surrounded by a polymer shell with uniform thickness and desired functional groups, and each polymer-coated nanotube or nanotube bundle is individual without interconnection to other coated nanotubes. The carbon nanotube is permanently maintained in a substantially unidirectional orientation inside the polymer shell as an individual nanotube or small bundle of nanotubes. The process further advantageously permits flexible and intelligent design of single or multiple and small or polymeric functional groups on the surface of the polymer coating, which permits compatibilization with a wide assortment of polymers.

Components of Modified CNT:

For the cores of the modified carbon nanotubes of the present invention, any suitable carbon nanotubes (CNT) may be used. For example, multi-walled carbon nanotubes (MWCNT), few-walled carbon nanotubes (FWCNT), double-walled carbon nanotubes (DWCNT), single-walled carbon nanotubes (SWCNT) or any mixture thereof. Single-walled carbon nanotubes (SWCNT) are particularly preferred.

The multifunctional monomers comprise vinyl moieties for polymerizing with vinyl moieties of vinyl phenyl groups anchored on the CNT sidewall. In the process, diazotization of 4-vinylaniline permits covalent attachment of vinyl phenyl to the sidewall of carbon nanotubes, wherein the vinyl moiety of the vinyl phenyl group is available for further polymerization with free-standing multifunctional monomers carrying at least one vinyl moiety.

The multifunctional monomer also comprises one or more functional groups for direct or indirect compatibilization with a polymer matrix. A single multifunctional monomer has at least one vinyl moiety and one or more functional groups for compatibilization with a polymer matrix. The type of functional groups employed will depend on the final use of the modified carbon nanotubes and polymer matrix. The functional groups may be small or polymeric functional groups. Some particularly preferred functional groups include but not limited to, for example, amino, hydroxyl, sulfonato, estero, halo (e.g. chloro), acetyl, epoxy, amido, diazo, anhydride, dendrimeric and carboxyl functional groups.

Some particularly preferred multifunctional monomers include, for example, vinylanilines (e.g., 4-vinylaniline or its derivatives), vinyl alcohol, vinyl alkyl alcohols (e.g., 4-penten-1-ol), vinyl phenols (e.g., 2-methoxy-4-vinylphenol), styrene derivatives (e.g., styrene sodium sulfonate), vinyl ester, vinyl chloride, vinyl acetate, methacrylic acid, methacrylates (e.g., glycidyl methacrylate (GMA), methyl methacrylate), acrylic acid, acrylates (e.g., methyl acrylate), acrylamide and acrylonitrile.

The polymer shell is formed when the free-standing multifunctional monomers are polymerized with vinyl moieties anchored on the side wall of carbon nanotubes. Free-standing 4-vinylaniline present in the reaction mixture itself may act as a source of the multifunctional monomer to polymerize with the vinyl moieties that are already anchored on the side wall of carbon nanotubes. If only an excess of 4-vinylaniline is present, then the resulting polymer shell is a homopolymer of 4-vinylaniline. If one or more other types of multifunctional monomers are present in the reaction mixture, then the polymer shell will be a copolymer of 4-vinyl phenyl and the other multifunctional monomer. Terpolymers and higher order polymers are possible by using mixtures of various multifunctional monomers.

As previously indicated, the polymer shell surrounds a central core formed by a single tube or small bundle of CNT. The polymer shell is advantageously about 10-400 nm thick and uniform in thickness, which contributes to keeping the CNT unidirectional or one-dimensional stretching along its longitudinal axis within the coating. Such unidirectionality provides beneficial effects on the physical and/or mechanical properties of composites prepared with the modified CNT.

Subsequent to the formation of the polymer shell, and still in situ, reactions may occur in situ by action of one or more of the reaction components to convert one functional group to another. For example, amino functional groups can be converted to hydroxyl functional groups in the presence of any water in the reaction mixture by the action of the diazotization agent such as isoamyl nitrite. Such further conversions result in modified carbon nanotubes with mixed functionalities, or with another functional group that is not available to be directly formed as described before. For example, further diazotization of amino groups on the surface of the polymer in the presence of a third multifunctional monomer with a desired functional group may result in the formation of C—N=N—C, ether, ester or any other linkages.

Further, depending on the final use of the modified nanotubes, secondary compatibilizers may be used to further enhance compatibility of the modified carbon nanotubes with another polymer. The secondary compatibilizer may be reacted with the functional groups on the modified carbon nanotubes before integration with another polymer, or the secondary compatibilizer may first be reacted or mixed with another polymer and then reacted with the modified carbon nanotubes upon integration of the modified carbon nanotubes with the other polymer. Some examples of secondary compatibilizers include polyethylene-graft-glycidyl methacrylate (PE-g-GMA), polypropylene-graft-glycidyl methacrylate (PP-g-GMA), polyethylene-graft-maleic anhydride (PE-g-MA) and polypropylene-graft-maleic anhydride (PP-g-MA).

Nanocomposites:

Nanocomposites comprise a composite of carbon nanotubes and polymer. Nanocomposites may comprise modified carbon nanotubes of the present invention mixed together with one or more additional polymers in any suitable proportion. The relative amounts of additional polymer and modified carbon nanotubes present in the nanocomposite will depend on the particular use to which the nanocomposite is put, the particular additional polymer or polymers, the ability to load the modified carbon nanotubes, the presence of any secondary compatibilizers and the presence of any other additives. Preferably, modified carbon nanotubes may be present in such nanocomposites in an amount in a range of from about 0.05 wt % to about 99 wt %, based on total weight of the nanocomposite. More preferably, the modified carbon nanotubes may be present in a range of about 0.05-49 wt %, even more preferably 0.05-30 wt %. The balance of such nanocomposites comprises additional polymer and any other suitable polymer additives. When the proportion of additional polymer in the nanocomposite is greater than 50 wt %, the additional polymer forms a matrix within which the modified carbon nanotubes are distributed. Conversely, when the proportion of modified carbon nanotubes in the nanocomposite is greater than 50 wt %, the modified carbon nanotubes form a matrix within which the additional polymer is distributed.

Furthermore, the modified carbon nanotubes of the present invention themselves can be considered a nanocomposite since the modified carbon nanotubes comprise carbon nanotubes and a polymer. In this case, no additional polymer is used and the nanocomposite comprises only modified carbon nanotubes. Products such as buckypaper may be formed solely from the modified carbon nanotubes of the present invention.

Nanocomposites comprising a mixture of modified carbon nanotubes and additional polymer are of particular note since an advantage of the modified carbon nanotubes of the present invention is their increased compatibility with additional polymers. The nanocomposite preferably comprises a polymer matrix of additional polymer or polymers having modified carbon nanotubes of the present invention homogeneously distributed therein.

The additional polymer or polymers may comprise any polymeric material suitable for the particular application for which the nanocomposite is intended. Polymers may be classified in a number of different ways. Suitable additional polymers may comprise a homopolymer, a copolymer, a terpolymer, or a mixture thereof. The polymer may comprise amorphous or crystalline polymers. The polymer may comprise hydrophobic or hydrophilic polymers. The polymer may comprise linear, branched, star, cross-linked or dendritic polymers or mixtures thereof. The polymer may comprise organic and/or inorganic polymers. Inorganic polymers include, for example, $SiO_2$. Polymers may also be conveniently classified as thermoplastic, thermoset and/or elastomeric. It is clear to one skilled in the art that a given polymer matrix may be classifiable into more than one of the foregoing categories.

Thermoplastic polymers generally possess significant elasticity at room temperature and become viscous liquid-like materials at a higher temperature, this change being reversible. Some thermoplastic polymers have molecular structures that make it impossible for the polymer to crystallize while other thermoplastic polymers are capable of becoming crystalline or, rather, semi-crystalline. The former are amorphous thermoplastics while the latter are crystalline thermoplastics. Some suitable thermoplastic polymers include, for example, olefinics (i.e., polyolefins), vinylics, styrenics, acrylonitrilics, acrylics, cellulosics, polyamides, thermoplastic polyesters, thermoplastic polycarbonates, polysulfones, polyimides, polyether/oxides, polyketones, fluoropolymers, conductive polymers, copolymers thereof, or mixtures thereof. Some suitable olefinics (i.e., polyolefins) include, for example, polyethylenes (e.g., LDPE, HDPE, LLDPE, UHMWPE, XLPE, copolymers of ethylene with another monomer (e.g., ethylene-propylene copolymer)), polypropylene, polybutylene, polymethylpentene, or mixtures thereof. Some suitable vinylics include, for example, polyvinylchloride, chlorinated polyvinylchloride, vinyl chloride-based copolymers, polyvinylidenechloride, polyvinylacetate, polyvinylalcohol, polyvinyl aldehydics (e.g., polyvinylacetal), polyvinylalkylethers, polyvinylpyrrolidone, polyvinylcarbazole, polyvinylpyridine, or mixtures thereof. Some suitable styrenics include, for example, polystyrene, polyparamethylstyrene, polyalphamethylstyrene, high impact polystyrene, styrene-based copolymers, or mixtures thereof. Some suitable acrylonitrilics include, for example, polyacrylonitrile, polymethylacrylonitrile, acrylonitrle-based copolymers, or mixtures thereof. Some suitable acrylics include, for example, polyacrylicacid, polymethacrylicacid, polymethacrylate, polyethylacrylate, polybutylacrylate, polymethylmethacrylate, polyethylmethacrylate, cyanoacrylate resins, hydroxymethylmethacrylate, polacrylamide, or mixtures thereof. Some suitable cellulosics include, for example, cellulose, cellulose esters, cellulose acetates, mixed cellulosic organic esters, cellulose ethers, methylcellulose, ethylcellulose, carboxymethylcellulose, hydroxyethylcellulose, or mixtures thereof. Some suitable polyamides include, for example, aliphatic polyamides (i.e., nylons), aromatic polyamides, transparent polyamides, or mixtures thereof. Some suitable thermoplastic polyesters/polycarbonates are, for example, polyalkylene terephthalates (e.g., polyethylene terephthalate, polybutylene terephthalate), polycyclohexanedimethanol terephthalates, polyarylesters (e.g., polyarylates), polycarbonate, or mixtures thereof. Some suitable polysulfones include, for example, diphenylsulfone, polybisphenolsulfone, polyethersulfone, polyphenylethersulfones, or mixtures thereof. Some suitable polyimides include, for example, polyamideimide, polyetherimide, or mixtures thereof. Some suitable polyether/oxides include, for example, polymethyleneoxides, polyethyleneoxide, polypropyleneoxide, polyphenyleneoxides, or mixtures thereof. Some suitable polyketones include, for example, polyetheretherketone-1. Some suitable fluoropolymers include, for example, polytetrafluoroethylene, polychlorotrifluoroethylene, polyvinylfluoride, polyvinylidenefluoride, polyperfluoroalkoxy, polyhexafluoropropylene, polyhexafluoroisobutylene, fluoroplastic copolymers, or mixtures thereof. Some suitable conductive polymers include, for example, poly(acetylene)s, poly(pyrrole)s, poly(thiophene)s, polyanilines, polythiophenes, poly(p-phenylene sulfide), poly(p-phenylene vinylene)s (PPV), polyindole, polypyrene, polycarbazole, polyazulene, polyazepine, poly(fluorene)s, and polynaphthalene.

Thermoset polymers (thermoset resins) generally arise from a complex combination of polymerization and cross-linking reactions, which convert low- or relatively low-molecular weight molecules into three-dimensional networks. The reaction is irreversible and the resulting polymeric species is generally hard. The polymerization and cross-linking reactions may be temperature-activated, catalyst-activated or mixing-activated. Some suitable thermosets include, for example, formaldehyde systems, furan systems, allyl systems, alkyd systems, unsaturated polyester systems, vinylester systems, epoxy systems, urethane/urea systems, or mixtures thereof. Some suitable formaldehyde systems include, for example, urea-formaldehyde resins, melamine-formaldehyde resins, phenol-formaldehyde resins, or mixtures thereof. Some suitable furan systems include, for example, furan resins, furfural resins, furfuryl alcohol resins, or mixtures thereof. Some suitable allyl systems include, for example, diallyl phthalate, diallyl isophthalate, diethyleneglycol bis(allyl carbonate), or mixtures thereof. Some suitable alkyd systems include, for example, the reaction product of ethylene glycol, glycerol and phthalic acid with fatty acids. Some suitable unsaturated polyester systems include, for example, one component which is a polyester product of a reaction between a difunctional acid or anhydride (e.g., maleic acid, maleic anhydride, phthalic anhydride, terephthalic acid) with a difunctional alcohol (e.g., ethylene glycol, propylene glycol, glycerol), and, a second component which is a monomer capable of polymerizing and reacting with unsaturations in the polyester component (e.g., styrene, alphamethylstyrene, methylmethacrylate, diallylphthalate). Some suitable vinylester systems include, for example, the reaction of diglycidyl ether of bisphenol A with methacrylic acid. Some suitable epoxy systems include, for example, the reaction between epichlorohydrin and a multifunctional acid, amine or alcohol. Some suitable urethane/urea systems include, for example, the reaction product of a liquid isocyanate (e.g., 2,4-toluenediisocyanate, 2,6-toluenediisocyanate) and a polyol (e.g., polyethylene ether glycol, polypropylene ether glycol).

Elastomeric polymers (elastomers) can generally be defined as materials capable of large elastic deformations and are often referred to as rubbers. Elastomers may be classified as vulcanizable elastomers, reactive system elastomers and thermoplastic elastomers. Some suitable elastomers include, for example, polyisoprene, polybutadiene, polychloroprene, polyisobutylene, styrene-butadiene rubber, acrylonitrile-butadiene rubber, ethylene-propylene rubber, ethylene-propylene-diene rubber, chlorinated polyethylene, chiorosulfonated polyethylene, ethylene-vinylacetate copolymer, ethylene-acrylate copolymer, fluoroelastomers (e.g., polyvinylidene fluoride, polychlorotrifluoroethylene), silicone polymers (e.g., polydimethylsiloxane), acrylic rubber, epichlorohydrin rubber, polysulfide rubbers, propyleneoxide rubbers, polynorbornene, polyorganophosphazenes, olefinic thermoplastic rubbers, styrenic thermoplastic rubbers, urethane thermoplastic rubbers, etherester thermoplastic rubbers, etheramide thermoplastic rubbers, copolymers of an elastomer, or mixtures thereof.

Of the various polymers, of particular note are polyethylene (PE), polypropylene (PP), polystyrene (PS), polybutadienes, conductive polymers (e.g. poly(acetylene)s, poly(pyrrole)s, poly(thiophene)s, polyanilines, polythiophenes, poly(p-phenylene sulfide), poly(p-phenylene vinylene)s (PPV)), polycarbonate (PC), polymethylmethacrylate (PMMA), single component epoxy resins, epoxy resin systems, epoxy vinyl ester resins, and any mixture thereof.

Although not necessarily preferred, the nanocomposites may also include suitable additives normally used in polymers. Such additives may be employed in conventional amounts and may be added directly to the process during formation of the nanocomposite. Illustrative of such additives known in the art are colorants, pigments, carbon black, fibers (glass fibers, aramid fibers, carbon fibers, carbon nanofibers (CNF), natural fibers), fillers, impact modifiers, antioxidants, stabilizers, flame retardants, reheat aids, crystallization aids, acetaldehyde reducing compounds, recycling release aids, oxygen scavengers, plasticizers, flexibilizers, nucleating agents, foaming agents, mold release agents, and the like, or their combinations. All these and similar additives and their use are known in the art and do not require extensive discussion.

In general, standard polymer processing techniques may be used to prepare nanocomposites. A discussion of such techniques may be found in the following three references: *Polymer Mixing*, by C. Rauwendaal, (Carl Hanser Verlag, 1998); *Mixing and Compounding of Polymers*, by I. Manas-Zloczower and Z. Tadmor (Carl Hanser Verlag, 1994); and *Polymeric Materials Processing: Plastics, Elastomers and Composites*, by Jean-Michel Charrier (Carl Hanser Verlag, 1991), the disclosures of which is hereby incorporated by reference in its entirety. Further, standard composite forming techniques may be used to fabricate products from the nanocomposites. For example, melt spinning, gel spinning, casting, vacuum molding, sheet molding, injection molding and extruding, melt blowing, spun bonding, blow molding, overmolding, compression molding, resin transfer molding (RTM), thermo-forming, roll-forming and co- or multilayer extrusion may all be used. Examples of products include components for technical equipment, apparatus casings, household equipment, sports equipment, bottles, other containers, components for the electrical and electronics industries, components for the transport industries, and fibers, membranes and films. The nanocomposites may also be used for coating articles by means of powder coating processes or solvent coating processes or as adhesives. Mixtures of different nanoreinforcements can be used to maximize the benefits from each. In the case of conventional reinforcements like fillers, whiskers, and fibers, all standard processing techniques for conventional composites can be used for the reinforced polymer nanocomposites, including compression, vacuum bag, autoclave, filament winding, braiding, pultrusion, calendaring, etc.

The nanocomposites are also suitable for the production of sheets and panels using conventional processes such as vacuum or hot pressing. The sheets and panels can be laminated to materials such as wood, glass, ceramic, metal or other plastics, and outstanding strengths can be achieved using conventional adhesion promoters, for example, those based on vinyl resins. The sheets and panels can also be laminated with other plastic films by coextrusion, with the sheets being bonded in the molten state. The surfaces of the sheets and panels can be finished by conventional methods, for example, by lacquering or by the application of protective films. The nanocomposites are also useful for fabrication of extruded films and film laminates, as for example, films for use in food packaging. Such films can be fabricated using conventional film extrusion techniques.

Advantages:

Advantageously, the process is simple, involving controllable polymerization of the multifunctional monomer by heating in situ while C—C covalent bonds are formed to the sidewall of the carbon nanotube without isolation of intermediates. The polymerization is provides a one dimensional structure whereby an individual core-shell structure is formed in which a carbon nanotube core is surrounded by a polymer shell of uniform thickness, and the individual core-shell structures are not interconnected with each other. The carbon nanotube is permanently maintained in a substantially unidirectional orientation inside the polymer shell as an individual nanotube or small bundle of nanotubes.

The process further advantageously permits flexible and intelligent design of modified carbon nanotubes having single or multiple toes of small or polymeric functional groups on the surface of the polymer coating, and provides the opportunity to make further chemical modifications to further improve compatibility with a wider assortment of additional polymers. This contributes to increased filling levels with additional polymers, more homogeneous dispersion of carbon nanotubes in the additional polymers and covalent connections to the additional polymers, and to superior physical properties of nanocomposites made therefrom. Polymer nanocomposites comprising modified carbon nanotubes of the present invention can have mechanical strengths of up to four times or more than the best carbon nanotube/polymer composites presently available.

Advantageously, polymer nanocomposites of the present invention may demonstrate little or no significant changes in TGA profile or glass transition temperature ($T_g$) (from DSC) indicating that little or no degradation of the polymer has occurred on mixing the polymer with the modified carbon nanotubes of the present invention. Further, polymer nanocomposites of the present invention can show significant improvement in TGA profile indicating an enhancement in thermal stability of the composite over the neat polymer.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 11A depicts a composite comprising unmodified MWCNT integrated into natural rubber (NR) matrix.

FIG. 11B depicts a composite comprising amino/hydroxyl modified MWCNT having a core-shell nanostructure integrated into natural rubber (NR) matrix.

FIG. 12A depicts a SEM image of the composite of FIG. 11A imaged on a smooth rubber surface.

FIG. 12B depicts a SEM image of the composite of FIG. 11B imaged on a rough rubber surface.

DESCRIPTION OF PREFERRED EMBODIMENTS

Example 1

Preparation of Modified SWCNT having Amino and Hydroxyl Functional Groups

Example 1a

Using excess 4-vinyaniline as Multifunctional Monomer 200 mg of WCPP-LV-SWCNT (bio-char) was ground in ACN (acetonitrile) and then transferred into a round bottom flask with magnetic stirring bar in 150 ml of ODCB (o-dichlorobenzene). The mixture was bath-sonicated for 1.5 hrs. Subsequently, 1.98 g (1.95 ml) of VA (4-vinylaniline) in 20 ml of ACN (acetonitrile) was injected into the mixture. The mixture was bath-sonicated for 10 minutes and then 3.91 g (4.5 ml) of IAN (isoamyl nitrite) was injected under stirring. The flask was assembled with a condenser and heated up to 60° C. in an oil-bath for 2 hours, then to 80° C. for 4 hrs. Afterwards the mixture was maintained at 65° C. overnight (14 hours) and then heated up to 85° C. for another 4.5 hours the next day. After cooling down to 50° C., the mixture was diluted with DMF (dimethylformamide) to 250 ml. The mixture was transferred into polyethylene plastic centrifuge bottles and centrifuged at 4750 RPM for 30 minutes. A deep orange-red clear solution was decanted. The yellow-greenish precipitate was transferred to a beaker with a large quantity of DMF and then washed a few times through bath-sonication centrifuge cycles. The liquid phase after centrifugation became yellow. More wash cycles were carried out with mixtures of solvents such as DMF/THF, DMF/toluene, DMF/MeOH, MEOH/ethanol, and ethanol/$H_2O$. Finally, the precipitate was filtrated with a polycarbonate membrane (>20 µm pore size, 47 mm in diameter) and washed with water, ethanol and methanol. The yellow-greenish solid powder was dried in air under water pump and then dried in an oven at 100° C. overnight, whereupon 2.04 g of dry sample was collected. The pure SWCNT loading is calculated to be close to 10 wt %.

Figure 1:
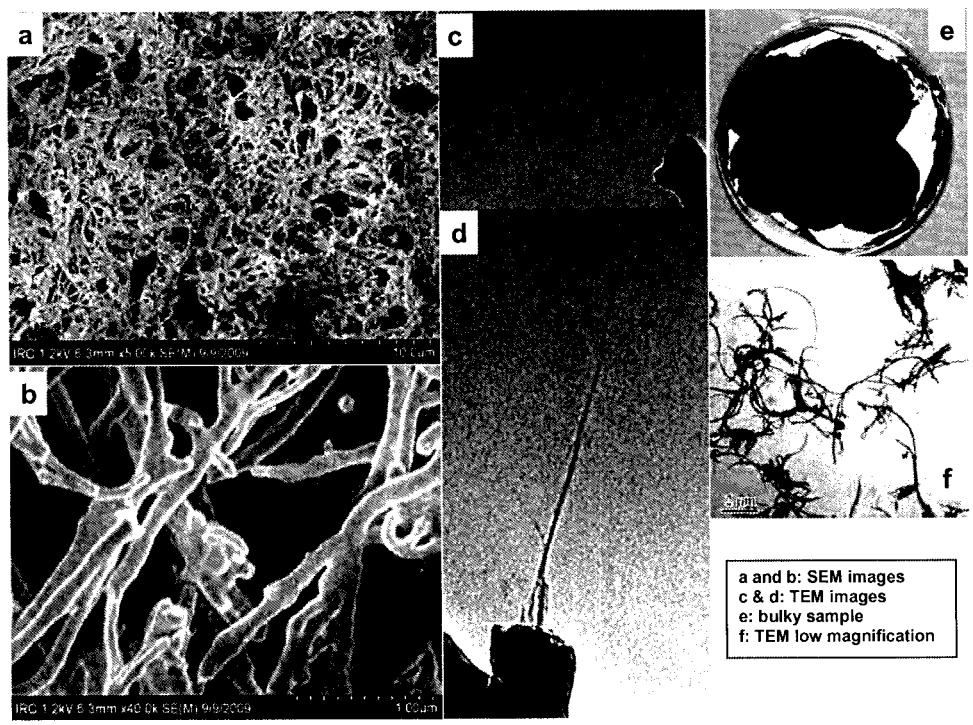
FIG. 1 depicts SEM images of amino/hydroxyl modified SWCNT having a core-shell nanostructure (1a: low magnification, 1b: high magnification), and TEM images of the modified SWCNT (1c, 1d: high magnification of single or small bundle of SWCNT forming the core of the nanostructures, 1f: low magnification of 1c, 1d, and 1e: bulky sample with yellow-greenish color).

SEM images show a core-shell structure with diameter range from 60 to 310 nm and more than a few µm long (FIG. 1a, 1b). TEM images reveal that a single or a small bundle of SWCNT forms the core of the structure (FIG. 1c, 1d), which is consistent with Raman signals.

The sample was further characterized using scanning transmission X-ray microscopy (STXM), which evidenced by an oxygen-rich surface layer indicating that terminal amine groups were partially converted to hydroxyl groups due to further reaction of the amine groups on 4-vinyl aniline with excess isoamyl nitrite. However, according to X-ray photoelectron spectroscopy (XPS), a substantial proportion of amine groups still remain on the surface of the polymer shell. Thus, the modified SWCNT comprises mixed amino/hydroxyl functionalization. STXM analysis has confirmed the same with 4-vinyaniline as reference.

Example 1B

Larger Scale Preparation using 50% Reduction in 4-vinyaniline as Compared to Example 1a 1.5 g of WCPP-LV-SWCNT was ground in 50 ml of ACN and transferred into 600 ml of ODCB in a 1 L round bottom flask having a magnetic stirring bar. While stirring, the mixture was probe-sonicated for 1.5 hours, and then 7.448 g (7.32 ml) VA was added. After mixing for a few minutes and bath-sonicating for 10 minutes, IAN was added. An additional 100 ml of ACN was added. The mixture was refluxed and stirred at 85° C. for 2 hours, after which the bath temperature was increased to 105° C. and the mixture refluxed and stirred for 4 hours. The mixture was then kept at 65° C. overnight, and then refluxed at 115° C. for an additional 5 hours the next day. After cooling down to 50° C., the mixture was diluted with 400 ml of DMF. The diluted mixture was transferred into PE centrifuge bottles and centrifuged at 4750 RPM for 30 minutes. The deep orange red solution was discarded and the precipitate was further washed with DMF until the solution became light yellow. The precipitate was then washed with EtOH and filtrated through wet-strength filter paper (>30 µm pore size) and subjected to washes with water, ethanol and methanol. The solid sample was dried in air and then in oven at 100° C. for a day. In total, 5.90 g was collected. The pure SWCNT loading is calculated to be close to 25.4 wt %.

Figure 2:
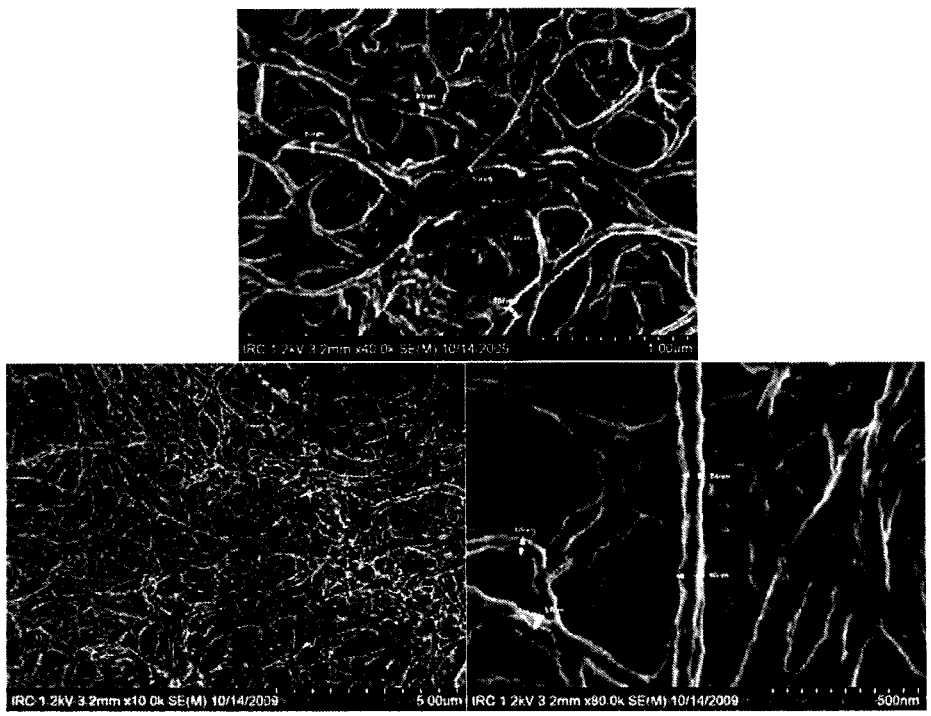
FIG. 2 depicts SEM images with different magnifications of amino/hydroxyl modified SWCNT having a core-shell nanostructure prepared from a scaled-up process using a 50% reduction in 4-vinylaniline in comparison to the modified SWCNT of FIG. 1.

SEM images (FIG. 2) and the calculated loading of SWCNT clearly indicate the amount of functionalized polymer coating is reduced by more than double compared with Example 1a. The diameter range is from 40 to 110 nm. But, XPS results indicate that the concentration of functional groups on the surface of the polymer remains practically unchanged.

Example 1C

Larger Scale Preparation using same Relative Amount of 4-vinyaniline as in Example 1a 2.81 g WCPP-LV-SWCNT was ground in ODCB and then transferred into 3-neck 2 L round bottom flask equipped with mechanical stirring. The mixture in 1.5 liters of ODCB was bath-sonicated for two hours, and then 28 g of VA was added under bath-sonication for an additional hour. Under vigourous mechanically stirring, 55 g of IAN was injected with a syringe at room temperature. After mixing for a few minutes, the mixture was heated up to 50° C. with an oil-bath for 2 hours, and then stirred at room temperature overnight. The next day, the mixture was refluxed at 105° C. for 10 hours, then slowly cooled down to room temperature overnight, then refluxed again the next day for an additional 2 hours, and then lowered to 50° C. and diluted with DMF to fill up the entire 2 L flask. The diluted mixture was kept in the flask for 10 days. The mixture was centrifuged at 4750 RPM for 30 minutes. The liquid phase was discarded and the precipitate was repeatedly washed with DMF (total volume used of about 20 liters until light yellow color), and subsequently washed in sequence with methanol, HQ water, methanol and filtrated with PC membrane. The solid sample was dried in air and then dried in an oven at 80° C. 22.68 g of dry sample was collected. The SWCNT loading is calculated to be close to 12.4 wt %.

Figure 4:
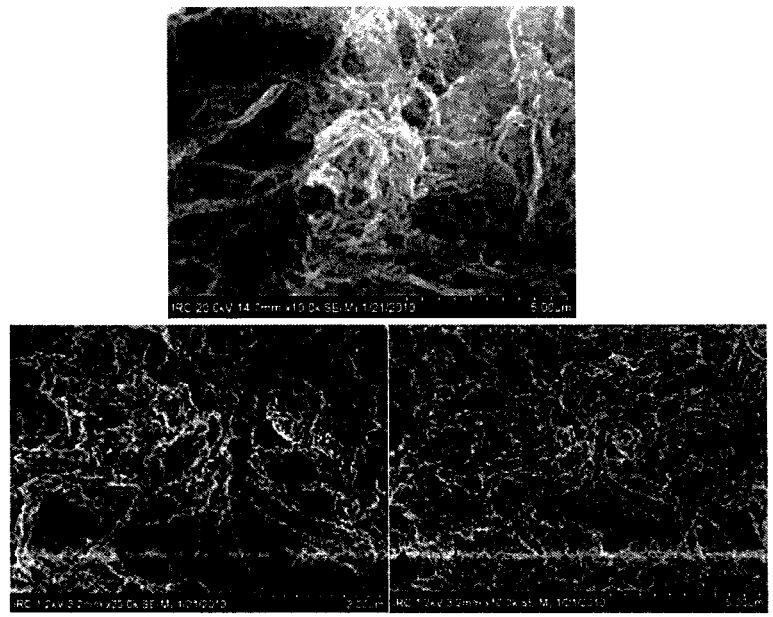
FIG. 4 depicts SEM images with different magnifications of amino/hydroxyl modified SWCNT having a core-shell nanostructure prepared from a scaled-up process using the same relative amount of 4-vinylaniline in comparison to the modified SWCNT of FIG. 1.

SEM images shown in FIG. 4 indicate that the surface morphology is not as smooth as Example 1a (FIG. 1) due to the large quantity of sample with inefficient stirring, but the core-shell structure is maintained. Further surface characterization with XPS analysis revealed that there is more N than O in the sample.

Example 2

Figure 3:
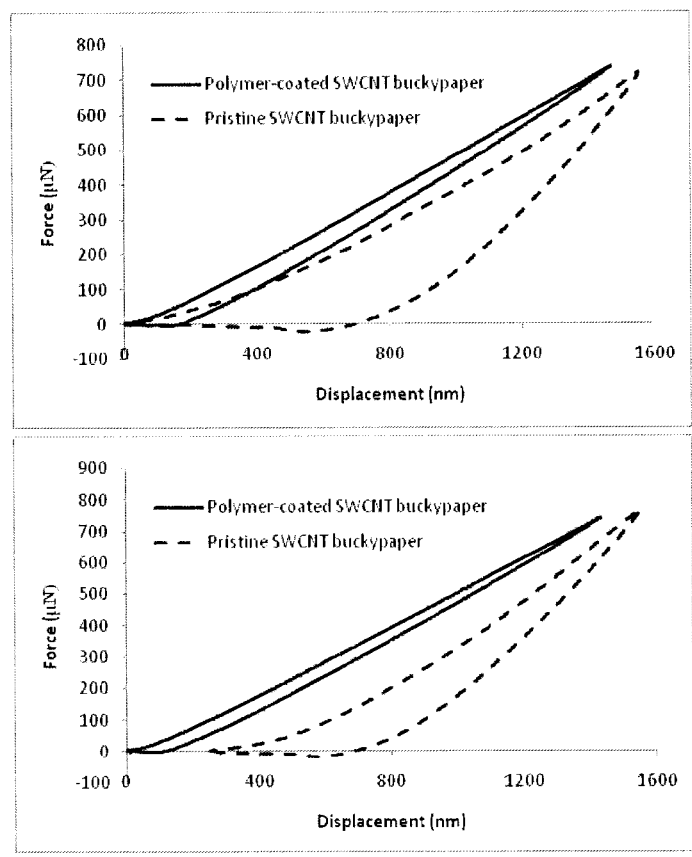
FIG. 3 depicts graphs of mechanical property of core-shell SWCNT buckypaper prepared from the modified SWCNT of FIG. 2 compared to pristine SWCNT buckypaper.

Preparation of Buckypaper from Modified SWCNT having Mixed amino/hydroxyl Functionalization Modified SWCNT of Example 1b was further developed into a buckypaper and its mechanical property measured as shown in FIG. 3 in comparison to pristine SWCNT buckypaper. The results demonstrate that buckypaper produced from the modified SWCNT is mechanically more resistant than the pristine buckypaper.

Example 3

Preparation of Composites from Modified SWCNT having Mixed amino/hydroxyl Functionalization Example 3a Polyolefin Composite 8.06 g of the greenish dry powder of the modified SWCNT of Example 1c was dispersed in THF (about 3 L) through tip and bath-sonication to form a well dispersed suspension. The suspension was concentrated by evaporating the THF by heating under stirring to about 1 liter. The concentrated suspension was then mixed with 1.5 L of xylene (Cas: 1330-20-7, Anachemia) containing 192 g of ultra-high molecular weight polyethylene (UHMWPE) white powder in an Erlenmeyer flask by mechanical stirring. The mixture was slowly heated up under vigorous mechanical stirring and nitrogen atmosphere. The remaining THF was continuously evaporated. When the evaporation of THF was nearly complete, the temperature of the mixture started to increase. When the temperature was close to the boiling point of xylene (i.e. near 130° C.), the morphology and color of the mixture became uniform to the naked eye. Within about 3 to 5 minutes, the temperature reached close to 140° C. and the mixture became very viscous, forming one big block. At this point mechanical stirring became impractical. The heating source was quickly removed and the mixture was allowed to cool down to room temperature. Free xylene was decanted and the solid was filtered with wet-strength filter paper and washed with methanol. The filtrand was dried in air with a water pump and dried at 85° C. in an oven overnight. The final loading of modified SWCNT in the UHMWPE composite was about 4 wt % which corresponds to a final SWCNT loading of about 0.5 wt %.

Example 3B

Figure 5A:
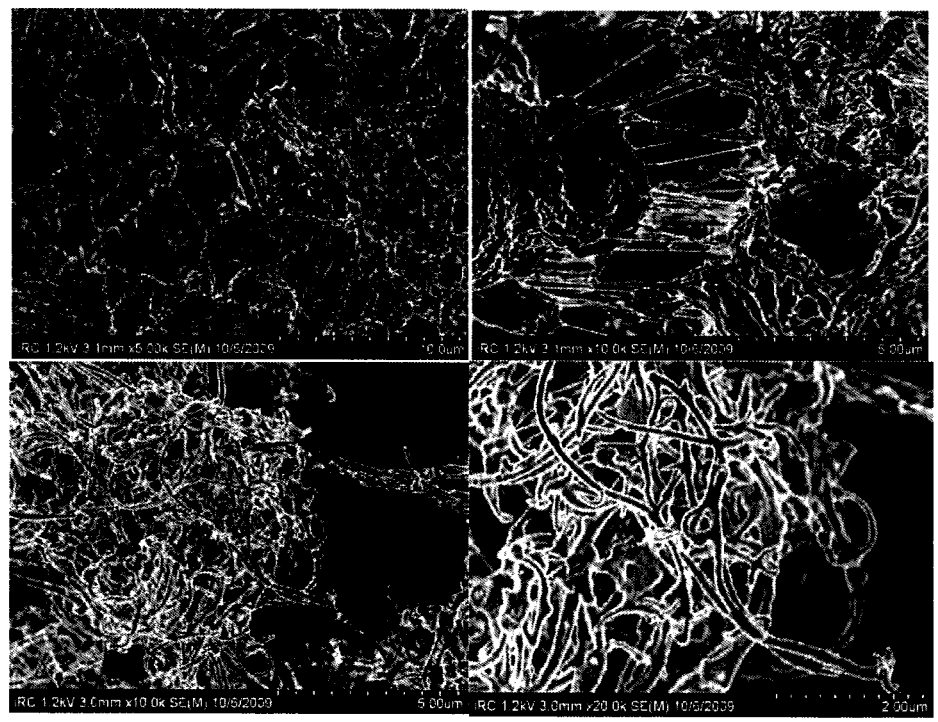
FIG. 5A depicts SEM images of amino/hydroxyl modified SWCNT having a core-shell nanostructure uniformly distributed in a PP-g-GMA matrix before hot-pressing.
Figure 5B:
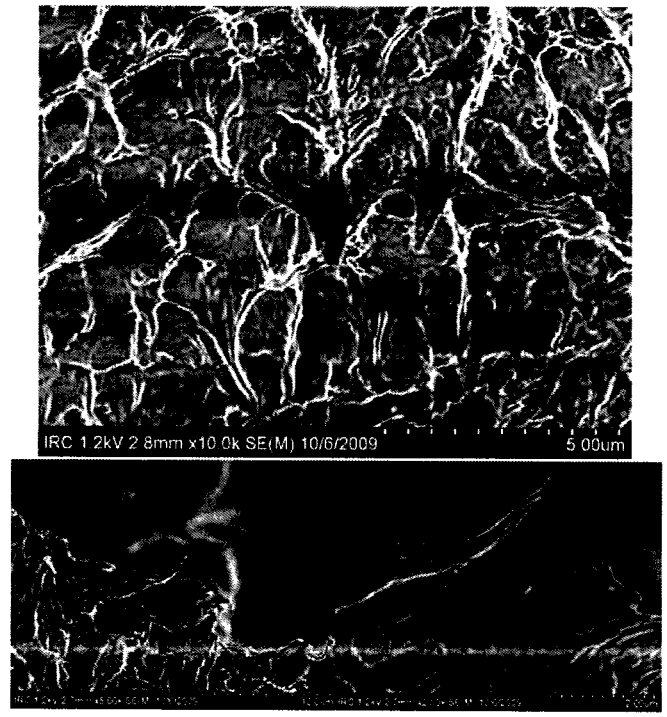
FIG. 5B depicts SEM images of amino/hydroxyl modified SWCNT uniformly distributed in a PP-g-GMA matrix after hot-pressing.

Secondary Compatibilizer Composite 56 mg of the modified SWCNT of Example 1a was bath-sonicated in 100 ml of xylene in an Erlenmeyer flask for 15 minutes, forming a well dispersed suspension. 495 mg of pellets of PP-g-GMA (polypropylene-g-glycidylmethacrylate, Orevac OE 905) was added and the mixture was slowly heated under stirring to 140° C. (after 120° C. the small white PP-g-GMA pellets dissolved in solution, and xylene starts to boil at 135° C.) under nitrogen. The temperature was maintained at 140° C. for 30 minutes, and then cooled down to room temperature under continuous stirring. The mixture was heated again to 140° C. and refluxed for further 30 minutes, and then cooled down to room temperature. Samples were taken from the cooled mixture for SEM and TEM measurements. The rest of the mixture was centrifuged at 9000 RPM for 30 minutes. The precipitate was washed with ethanol twice. Samples were taken again for SEM and TEM measurements. The rest of the sample was filtered through a PC membrane (20 μm, 47 mm). A fraction of the sample was used to make a paper-like sheet by hot-pressing in between two aluminum plates at 120° C. for an hour, and subsequently at 200° C. for another hour. The pressed sample became black, and one small piece was taken for SEM measurement. From the SEM images, the core-shell nanostructure is apparent before hot-pressing (FIG. 5A) but disappears after hot-pressing (FIG. 5B), indicating that chemical blending (interfacial connection) has occurred.

Example 3C

Polyolefin Composite with Secondary Compatibilizer 1.5 g of greenish powder of the modified SWCNT of Example 1c was bath-sonicated in 1 L of THF to produce a well-dispersed suspension. The suspension was mixed with 15 g of PE-g-GMA (polyethylene-g-glycidylmethacrylate) in 500 ml of xylene. The mixture was slowly heated up under nitrogen with magnetic stirring. When the mixture reached 100-110° C. under strong THF reflux, the PE-g-GMA dissolved. The temperature was kept constant at 100-110° C. for an hour and then cooled down to room temperature. Then, 22.5 g of UHMWPE was added with an additional 100 ml of xylene. The mixture was slowly heated again with strong stirring under nitrogen up to 130° C. and the temperature was maintained for 2 hrs. The mixture was then heated to 140° C. to the boiling point of xylene for 5 minutes. The heating source was removed and the mixture was allowed to cool down under stirring to room temperature. The supernatant xylene was decanted. The slurry was filtered through a wet-strength filter paper with a water pump. The solid was washed with methanol and dried in air with water pump suction, and then dried at 85° C. in an oven overnight. The loading of the modified SWCNT in the final composite was calculated to be close to 4 wt %. The corresponding loading of pure SWCNT is about 0.5 wt %.

Example 3D

Figure 6A:
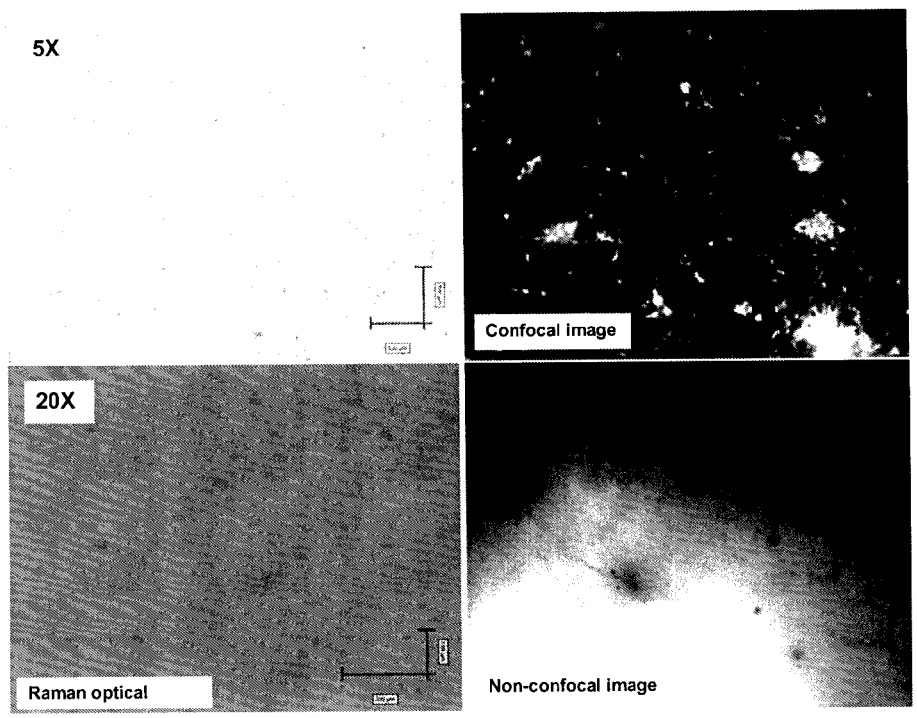
FIG. 6A depicts microscopic images of amino/hydroxyl modified SWCNT integrated into MY0510 epoxy resin before curing into a composite.

Epoxy Resin Composite 55 mg of greenish powder of the modified SWCNT of Example 1a was bath-sonicated in 20 ml of THF until a well dispersed suspension formed. The suspension was then mixed with 4.725 g of MY0510 epoxy resin. The mixture was bath-sonicated and vigorously shaken with a mechanical shaker. Thereafter, the THF solvent was evaporated on a heating plate. The THF removal was completed by sparging nitrogen or air while maintaining the temperature in the 110-120° C. range. After cooling down to room temperature, a drop of the brownish liquid resin sample was viewed under Raman microscope and optical images were taken as well as high magnification fluorescence microscopy to check for the quality of the dispersion (FIG. 6A).

Figure 6B:
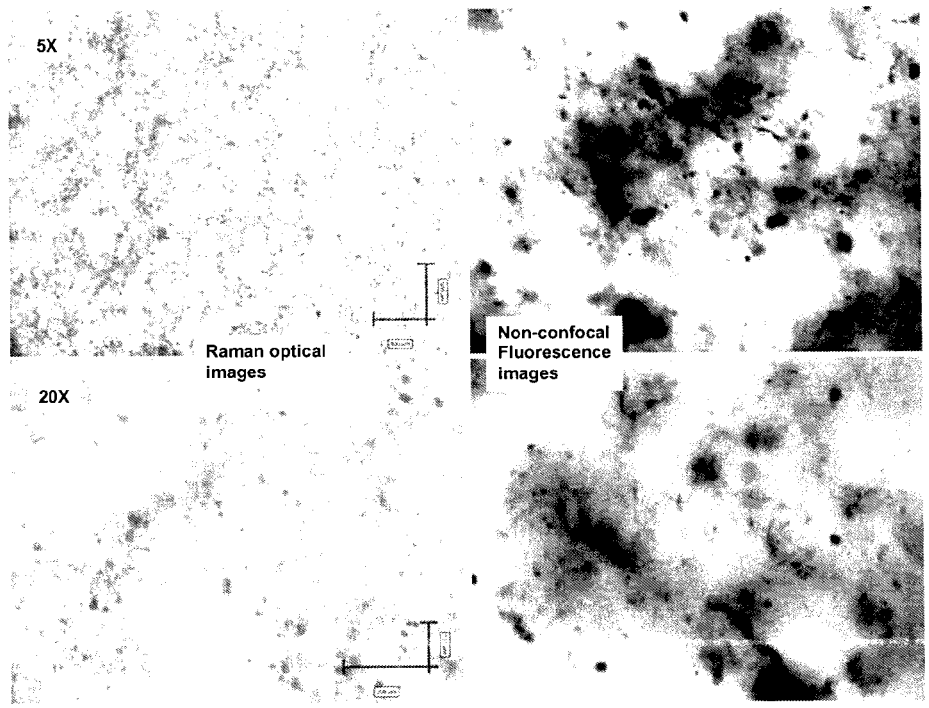
FIG. 6B depicts microscopic images of amino/hydroxyl modified SWCNT integrated into MY0510 epoxy resin after curing with 4,4'-DDS.
Figure 7:
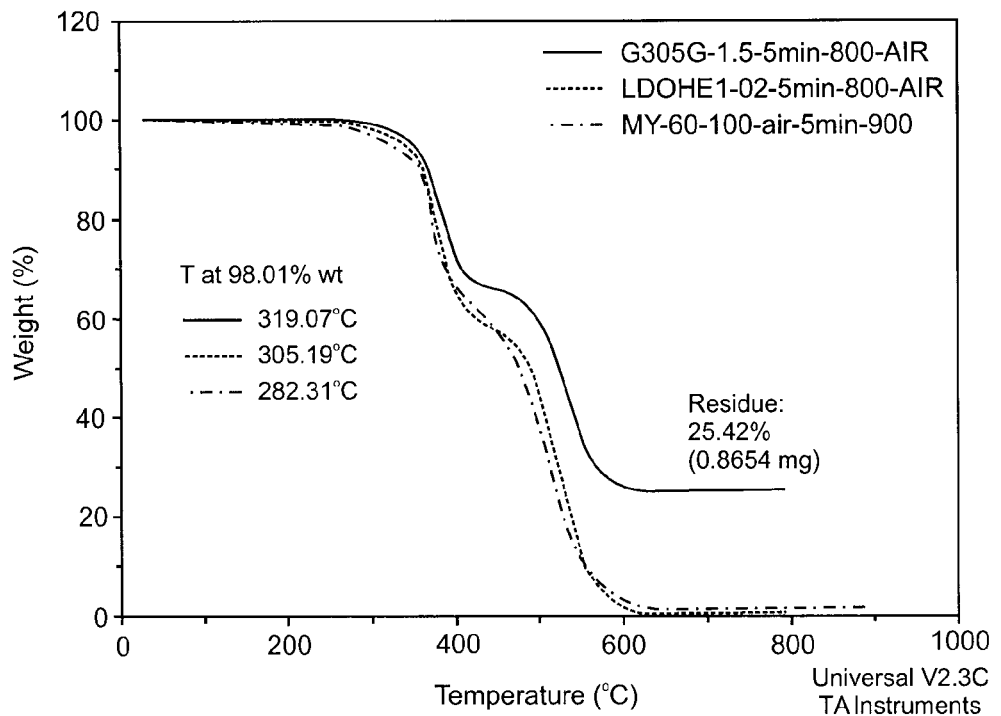
FIG. 7 depicts TGA profile of a cured MY0510 epoxy resin with 1.15 wt % loading of amino/hydroxyl modified SWCNT.
Figure 7:
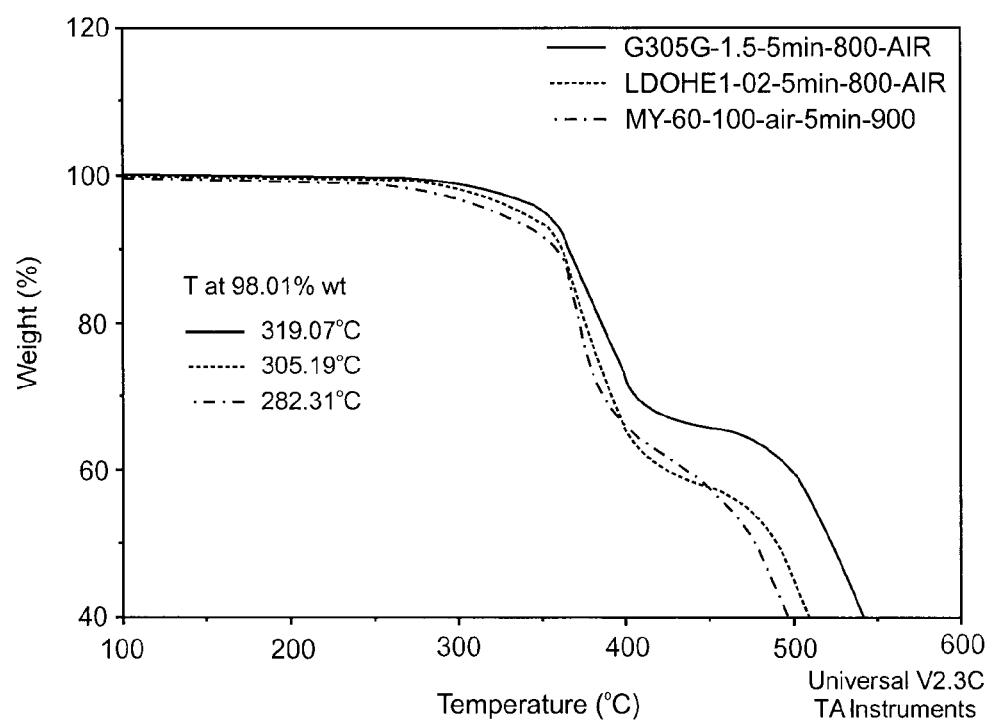

138.5 mg of the brownish liquid resin was mixed with 83.1 mg of white powder of 4,4'-DDS (curing ratio was 100:60 by weight) on a glass slide with a glass rod, and then the glass slide heated to 100° C. The resin mixture was mixed further in an open-air oven. The oven temperature was increased to 120° C. to lower the resin viscosity further. The mixture was stirred further again. The resin was spread as a thin layer on the glass slide and heated at 145° C. for 2 hours. Then the oven temperature was increased to 160° C. and the sample was cured at this temperature for another 2 hours. After cooling down to room temperature, the color of the cured composite sample was dark yellow. High magnification microscopy optical images were taken and these are shown in FIG. 6B. TGA profile of cured MY0510 epoxy resin having 1.15 wt % loading of modified SWCNT is shown in FIG. 7, where the lower profile has a magnified scale on the weight and temperature axes. The TGA profile indicates an enhancement in thermal stability of the nanocomposite over the neat resin.

Example 4

Preparation of Modified CNT having Epoxy Functional Groups

Example 4a

Using glycidyl methacrylate (GMA) as a multifunctional monomer 35 mg (about 2.9 mmol C) of purified plasma SWCNT was placed in a round bottomed flask and was dried in an oven at 100° C. for 1 hour. 30 mL of ODCB was added and the mixture was bath-sonicated for 1 hour to allow for dispersion. Thereafter, 150 mg (1.3 mmol) of VA was dissolved in 10 mL of ACN and then added to the SWCNT suspension. At this point, 2.4 mL (17.6 mmol) of glycidyl methacrylate was added and nitrogen gas was sparged through the suspension for 10 min. Subsequently, 2.4 mL (21.3 mmol) of IAN was degassed and added to the suspension with a syringe. The suspension was stirred for 72 hours at 60° C. After cooling to room temperature, the suspension was filtered through a 0.22 μm polytetrafluoroethylene (PTFE) membrane and washed with DMF until the filtrate remained clear. The sample was dried at 80° C. in a vacuum oven for 1 hour and then at 100° C. at atmospheric pressure for 24 hours. Raman spectra gave an average ID/IG ratio of 0.421±0.087, indicating significant functionalization compared to the original sample. Thermogravimetric analyses showed that the sample is made of 56.3% SWCNT and 43.7% of copolymer shell (±0.4%, average of 2 runs after subtracting residual catalyst and solvent mass losses).

Example 5

Preparation of Composites from Modified CNT having Epoxy Functional Groups

Example 5a

Polycarbonate Composite 20 g of polycarbonate (PC) was dissolved in 300 mL of THF with bath-sonication. 15 mL of the PC solution was added to 50 mg of the modified SWCNT of Example 4a and tip-sonicated for 30 min. The resulting black solution was poured to a mold and allowed to dry slowly overnight at room temperature. Raman spectra gave an average ID/IG value of 0.563±0.054. Raman spectroscopy mapping of the composite showed that the composite was well dispersed compared to a composite of raw SWCNT in polycarbonate, in which SWCNT was used without surface functionalization. Differential scanning calorimetry (DSC) of the composite of the present invention showed a slight decrease in the $T_g$ value versus neat polycarbonate, with the thermal stability (by thermal gravimetric analysis (TGA)) of the composite remaining the same as neat polycarbonate.

Example 6

Preparation of Modified MWCNT having Amino and Hydroxyl Functional Groups 9.04 g of MWCNT powder was placed in a three neck round-bottom flask in 800 ml of ODCB (o-dichlorobenzene). The mixture was bath-sonicated for 1 hr, and then 15 g of 4-vinylaniline in acetonitrile was added. The mixture was stirred for 10 minutes and bath-sonicated for 1 hr. Under strong mechanical stirring, 29.5 g of isoamyl nitrite was added drop wise into the suspension over 20 minutes. After 30 minutes stirring, the mixture was warm due to the reaction. After addition, a heating mantle was applied to further increase the temperature to a gentle reflux of acetonitrile for 3.5 hr. After two days stirring at room temperature, the mixture was refluxed for 4 hr. Then the mixture was cooled to 60° C. and diluted with DMF to 2 L in total in a beaker. After stirring and bath-sonication for 1 hr, the mixture was transferred into a plastic centrifuge bottle and centrifuged at 4750 RPM for 50 min. After centrifugation, the dark orange solution was discarded. The precipitate was washed with DMF for a few more cycles, and then with MeOH, from which a small amount of suspension was taken for SEM and TEM analysis. After washing with MeOH, the precipitate was filtrated through polycarbonate (PC) membrane and further washed with MeOH. After drying in air under vacuum, and then drying in an oven at 110° C. for two days, the final product was collected as a black powder (22.67 g). The dried sample was analyzed by TGA-MS-FTIR. The final dry sample contained 39.87 wt % MWCNT.

Figure 8A:
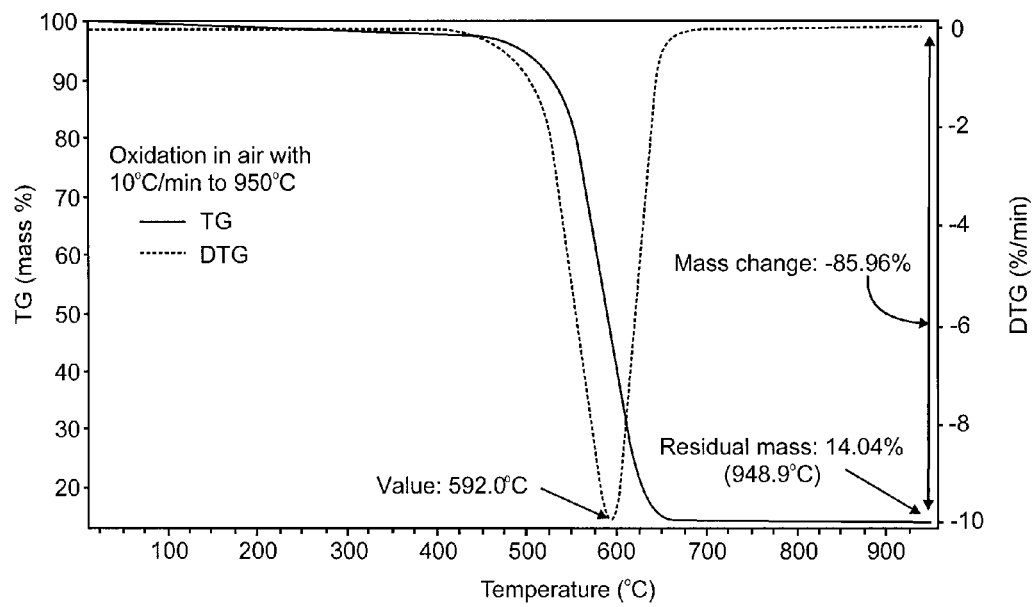
FIG. 8 depicts TGA profiles of un-modified MWCNT (FIG. 8A), and amino/hydroxyl modified MWCNT having a core-shell nanostructure (FIG. 8B).
Figure 8B:
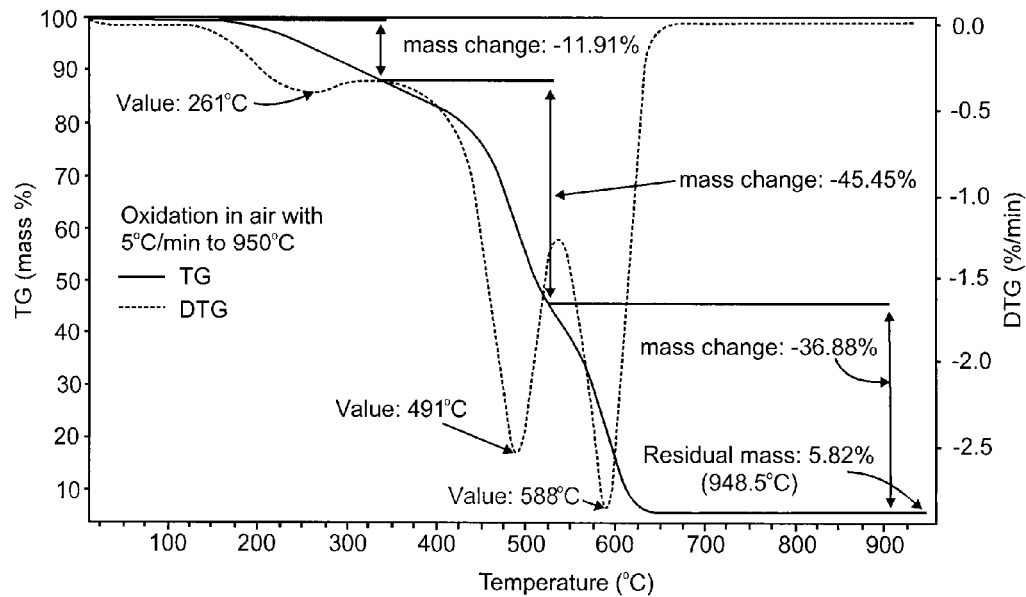

TGA analysis (FIG. 8) shows a single sharp decomposition of unmodified MWCNT at 592° C. (FIG. 8A). The modified MWCNT has three decomposition temperatures at 261° C., 491° C. and 588° C. (FIG. 8B), where the lower decomposition temperatures reflect decomposition in the coating and the highest temperature represents decomposition of the carbon nanotubes themselves.

Figure 9A:
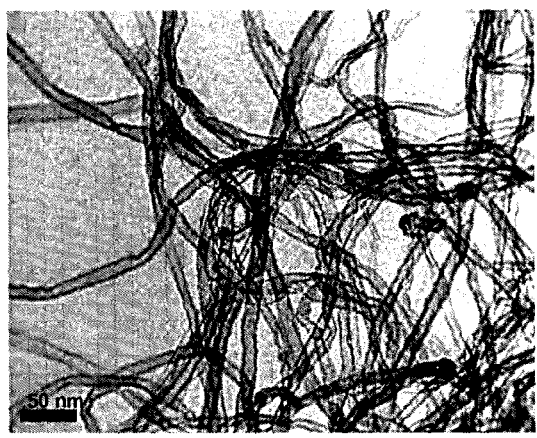
FIG. 9 depicts TEM images of un-modified MWCNT (FIG. 9A), and amino/hydroxyl modified MWCNT having a core-shell nanostructure (FIG. 9B).
Figure 9B:
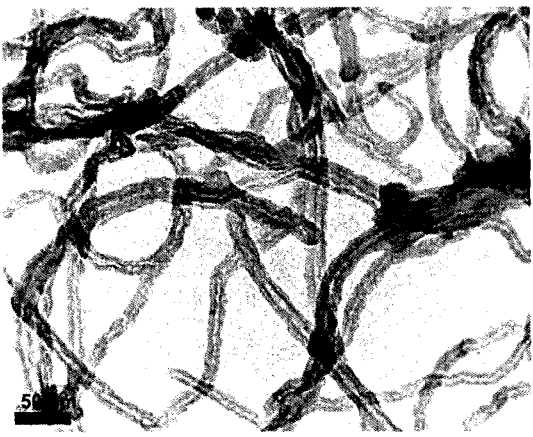
Figure 10A:
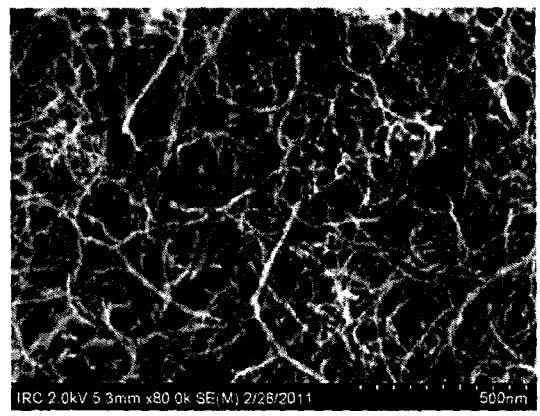
FIG. 10 depicts SEM images of un-modified MWCNT (FIG. 10A), and amino/hydroxyl modified MWCNT having a core-shell nanostructure (FIG. 10B).
Figure 10B:
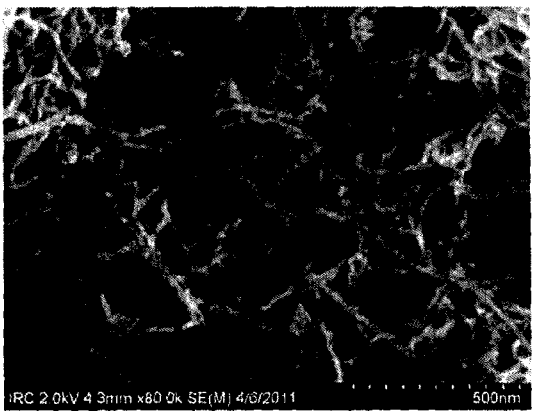

TEM images of MWCNT before and after modification are shown in FIG. 9A and FIG. 9B, respectively. TEM images reveal that a single or a small bundle of MWCNT forms the core of a core-shell structure, which is less than 50 nm in diameter. SEM images of MWCNT before and after modification are shown in FIG. 10A and FIG. 10B, respectively. SEM images show that the modified MWCNT having the core-shell structure are more than a few μm long.

Example 7

Integration of Unmodified MWCNT into Natural Rubber (NR) Matrix as a Comparative Example 2.72 g of the unmodified MWCNT as provided by the manufacturer as a dry powder was ground in 2 L toluene and tip- and bath-sonicated for 5 hrs. The suspension was poured into a yellow solution of 51.6 g of NR in 2 L toluene. Natural rubber (NR) primarily comprises high cis-1,4-polyisoprene. The mixture was strongly stirred by mechanical stirring for two days, with occasional high shear mixing to further disperse the raw MWCNT into the NR matrix for short period of time. Since high shear mixing generates heat, overheating of the rubber material should be avoided to avoid crosslinking. Afterward, most of the solvent was evaporated while the mixture was continuously stirred. The residue of the mixture was then placed in a vacuum oven at 35° C. to remove the remaining solvent. The rubber/MWCNT composite (FIG. 11A) so formed contained 5 wt % MWCNT. The SEM image of the composite is shown in FIG. 12A.

Example 8

Integration of Core-Shell Structured MWCNT into Natural Rubber (NR) Matrix 7.37 g of the modified MWCNT from Example 6 as a dry powder was ground in 2 L toluene and tip- and bath-sonicated for 5 hrs. The suspension was poured into a yellow solution of 51.4 g of NR in 2 L toluene. The mixture was strongly stirred by mechanical stirring for two days, with occasional high shear mixing to disperse the modified MWCNT into the NR matrix for short period of time. Afterward, most of the solvent was evaporated with compressed air while the mixture was continuously stirred. The residue of the mixture was then placed in a vacuum oven at 35° C. to remove the remaining solvent. The rubber/modified MWCNT composite (FIG. 11B) so formed contained 5 wt % neat MWCNT. The SEM image of the composite is shown in FIG. 12B.

REFERENCES

The Contents of the Entirety of each of which are Incorporated by this Reference Afzali-Ardakani A, Avouris P, Hannon J B, Klinke C. (2009) United States Patent Publication 2009-301349 published Dec. 10, 2009.
Bahr J L, Tour J M. (2001) Chem. Mater. 13, 3823-3824.
Choi J H, Oh S B, Chang J, Kim I, Ha C-S, Kim B G, Han J H, Joo S-W, Kim G-H, Paik H. (2005) Polymer Bulletin. 55, 173-179.
Dyke C A, Tour J M. (2003) J. Am. Chem. Soc. 125, 1156.
Guan J, Simard B. (2008) Canadian Patent Application 2,679, 280 published Sep. 4, 2008.
Hill D E, Lin Y, Rao A M, Allard L F, Sun Y-P. (2002) Macromolecules. 35, 9466-9471.
Koval'chuk A A, Shevchenko V G, Shchegolikhin A N, Nedorezova P M, Klyamkina A N, Aladyshev A M. (2008) Macromolecules. 41, 7536-7542.
Nayak R R, Lee K Y, Shanmugharaj A M, Ryu S H. (2007) Eur. Poly. J. 43, 4916-4923.
Nayak R R, Shanmugharaj A M, Ryu S H. (2008) Macromol. Chem. Phys. 209, 1137-1144.
Simard B, Guan J, Dénommée S. (2008) International Patent Publication WO2008/104078 published Sep. 4, 2008.
Yang B X, Pramoda K P, Xu G Q, Goh S H. (2007) Adv. Fund. Mater. 17, 2062-2069.
Yin Z, Zhang Y, Zhang X, Yin J. (1998) Polymer. 39(3), 547-551.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. Modified carbon nanotube comprising a carbon nanotube core covalently bound to a polymer shell surrounding the carbon nanotube core, wherein said covalent bond consists of a bond between a carbon atom on the carbon nanotube core and a carbon atom on the polymer shell, and wherein the polymer shell comprises a homopolymer of 4-vinylaniline or a copolymer of 4-vinylaniline and one or more other types of multifunctional monomers having one or more functional groups compatible with or able to covalently connect to another polymer.

2. The modified carbon nanotube according to claim 1, wherein the carbon nanotube core comprises single-walled or multi-walled carbon nanotube.

3. The modified carbon nanotube according to claim 1, wherein the functional groups comprise amino, hydroxyl, sulfonato, oxycarbonyl, halo, acetyl, epoxy, amido, diazo, anhydride or carboxyl functional groups or mixtures thereof.

4. The modified carbon nanotube according to claim 1, wherein the multifunctional monomer comprises a vinylaniline, vinyl alcohol, a vinyl alkyl alcohol, a vinyl phenol, a styrene derivative, vinyl ester, vinyl chloride, vinyl acetate, methacrylic acid, a methacrylate, acrylic acid, an acrylate, acrylamide, acrylonitrile or any mixture thereof.

5. The modified carbon nanotube according to claim 1, wherein the multifunctional monomer comprises vinyl alcohol, 4-penten-1-ol, 2-methoxy-4-vinylphenol, styrene sodium sulfonate, vinyl ester, vinyl chloride, vinyl acetate, methacrylic acid, glycidyl methacrylate, methyl methacrylate, acrylic acid, methyl acrylate, acrylamide, acrylonitrile or mixtures thereof.

6. The modified carbon nanotube according to claim 1 wherein the multifunctional monomer comprises glycidyl methacrylate.

7. The modified carbon nanotube according to claim 1, further comprising a secondary compatibilizer.

8. The modified carbon nanotube according to claim 7, wherein the secondary compatibilizer comprises polyethylene-graft-glycidyl methacrylate, polypropylene-graft-glycidyl methacrylate, polyethylene-graft-maleic anhydride, polypropylene-graft-maleic anhydride or any mixture thereof.

9. The modified carbon nanotube according to claim 1, wherein the polymer shell has a uniform thickness in a range of 10-400 nm.

10. The modified carbon nanotube according to claim 1, wherein the carbon nanotube core has a substantially unidirectional orientation along the longitudinal axis of CNT within the polymer shell.

11. The modified carbon nanotube according to claim 1 for use as a reinforcing filler in a polymer matrix.

12. A polymeric nanocomposite comprising modified carbon nanotubes as defined in claim 1.

13. The polymeric nanocomposite according to claim 12, wherein the modified carbon nanotubes are mixed with another polymer.

14. The polymeric nanocomposite according to claim 13, wherein the modified carbon nanotubes are homogeneously distributed in a matrix of the other polymer.

15. The polymeric nanocomposite according to claim 13, wherein the other polymer comprises a polyethylene, a polypropylene, a polystyrene, a polybutadiene, a poly(acetylene), a poly(pyrrole), a poly(thiophene), a polyaniline, a polythiophene, a poly(p-phenylene sulfide), a poly(p-phenylene vinylene), a polycarbonate, polymethylmethacrylate, a polyisoprene, a single component epoxy resin, an epoxy resin system, an epoxy vinyl ester resin or any mixture thereof.

16. A process of producing modified carbon nanotube, the process comprising: reacting neutral carbon nanotube with 4-vinylaniline in an organic solvent through a diazonium reaction in presence of one or more types of multifunctional monomers carrying a vinyl moiety and one or more functional groups for compatibilization with or connection to another polymer, the reaction conducted at least in part at a temperature of from 25° C. to 120° C. without isolation of intermediates and without addition of any extra initiator or catalyst to form a polymer shell in situ around the carbon nanotube, the polymer shell covalently bound to carbon nanotube sidewall through C—C bonds and wherein the polymer shell comprises a homopolymer of 4-vinylaniline or a copolymer of 4-vinylaniline and one or more other types of multifunctional monomers having one or more functional groups compatible with or able to covalently connect to another polymer.

17. The process according to claim 16, wherein the diazonium reaction is effected with a diazotization agent comprising isoamyl nitrite.

18. The process according to claim 16, wherein the functional groups comprise amino, hydroxyl, sulfonato, oxycarbony, halo, acetyl, epoxy, amido, diazo, anhydride or carboxyl functional groups or mixtures thereof.

19. The process according to claim 16, wherein the multifunctional monomers comprise a vinylaniline, vinyl alcohol, a vinyl alkyl alcohol, a vinyl phenol, a styrene derivative, vinyl ester, vinyl chloride, vinyl acetate, methacrylic acid, a methacrylate, acrylic acid, an acrylate, acrylamide, acrylonitrile or any mixture thereof.

20. The process according to claim 16, wherein the multifunctional monomers comprise vinyl alcohol, 4-penten-1-ol, 2-methoxy-4-vinylphenol, styrene sodium sulfonate, vinyl ester, vinyl chloride, vinyl acetate, methacrylic acid, glycidyl methacrylate, methyl methacrylate, acrylic acid, methyl acrylate, acrylamide, acrylonitrile or mixtures thereof.

* * * * *